March 31, 1936.  O. R. COURTNEY  2,035,462
STREAMLINE MOTORCYCLE BODY
Filed July 12, 1934  4 Sheets-Sheet 1
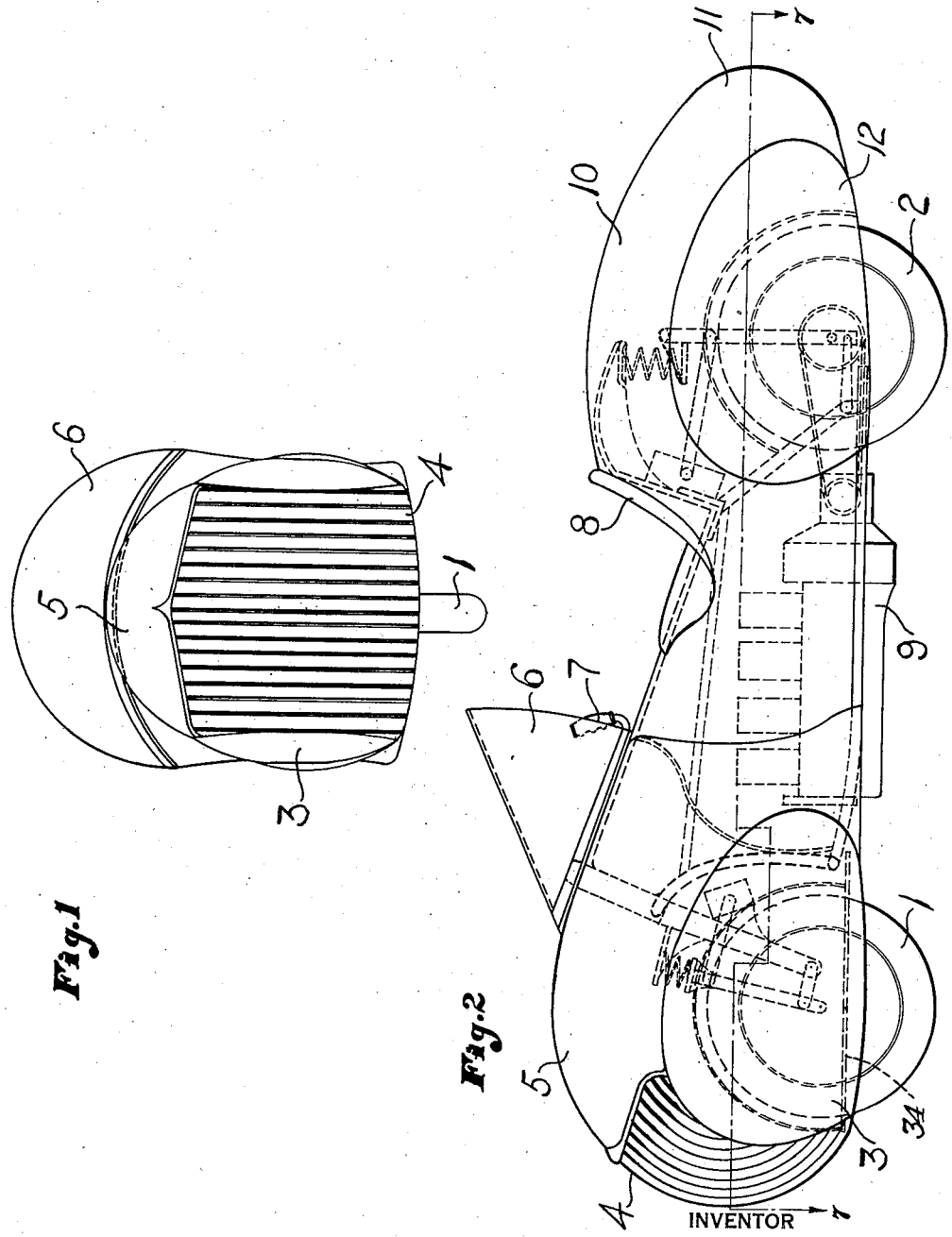
INVENTOR
Oriley Ray Courtney
BY Samuel H. Davis
ATTORNEY March 31, 1936. O. R. COURTNEY 2,035,462
STREAMLINE MOTORCYCLE BODY
Filed July 12, 1934   4 Sheets-Sheet 2
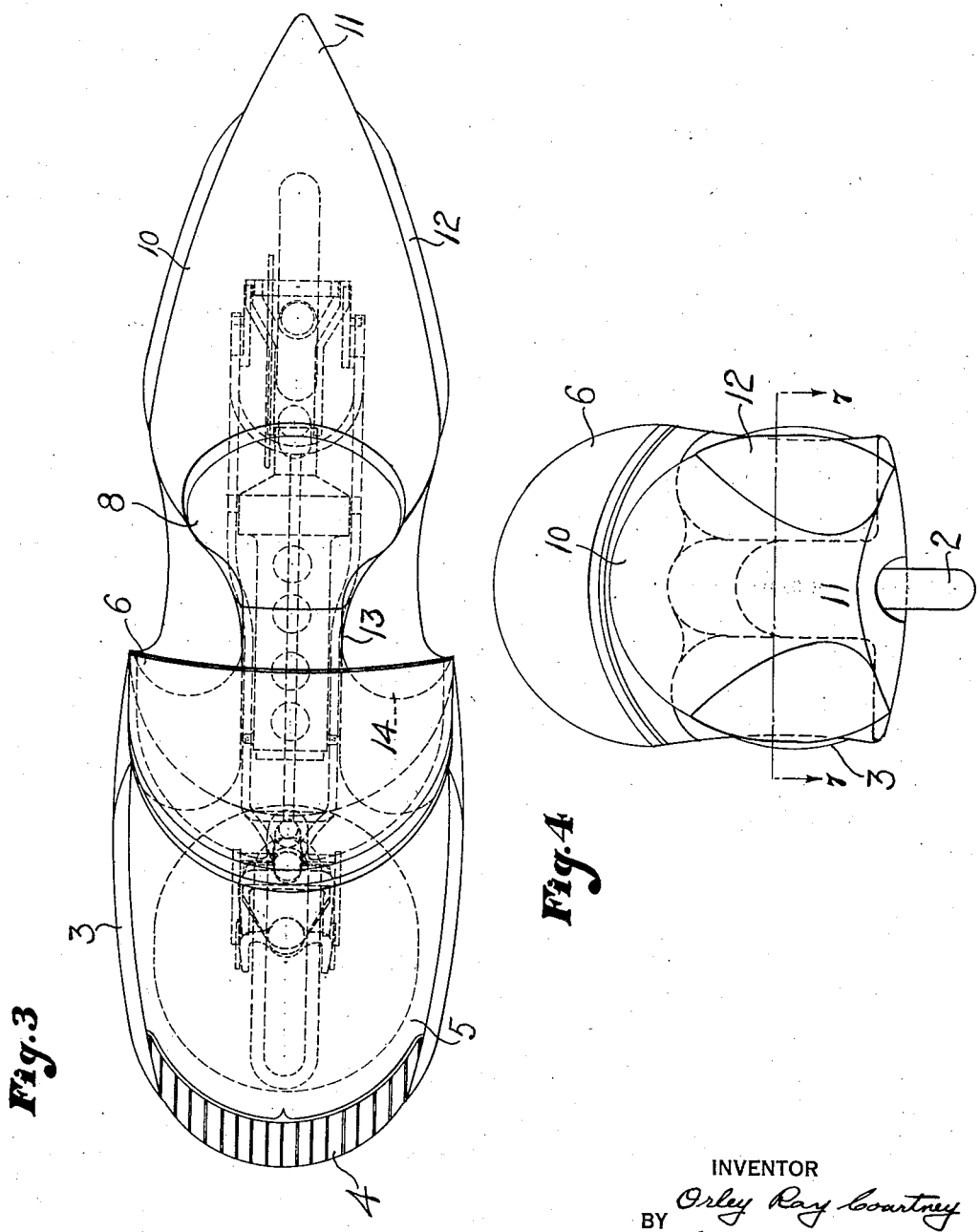
INVENTOR
Orley Ray Courtney
BY Samuel H. Davis
ATTORNEY

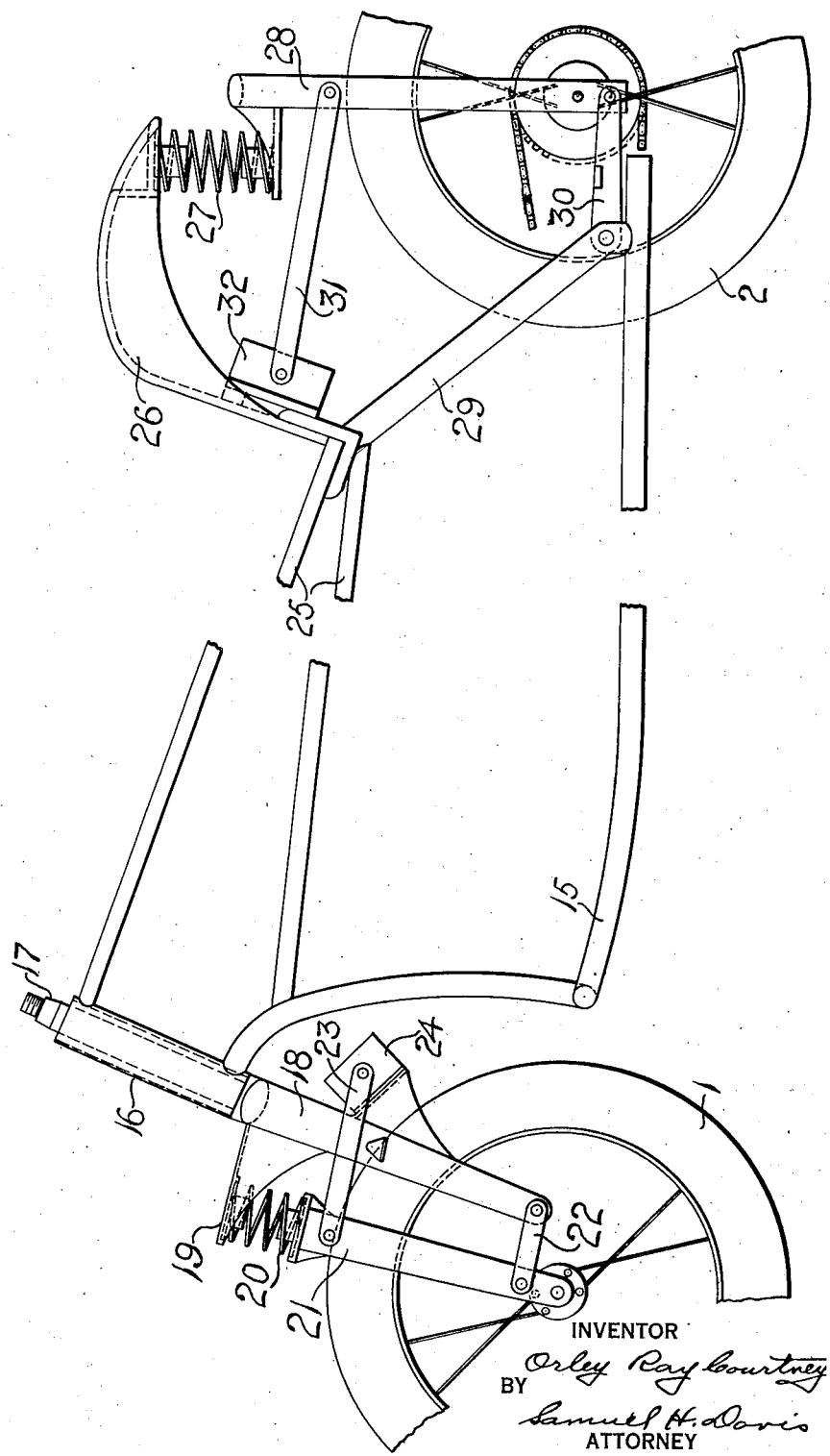

March 31, 1936.  O. R. COURTNEY  2,035,462
STREAMLINE MOTORCYCLE BODY
Filed July 12, 1934   4 Sheets-Sheet 4
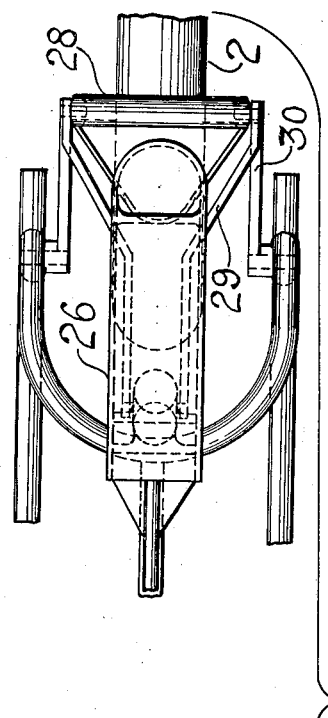
Fig. 6
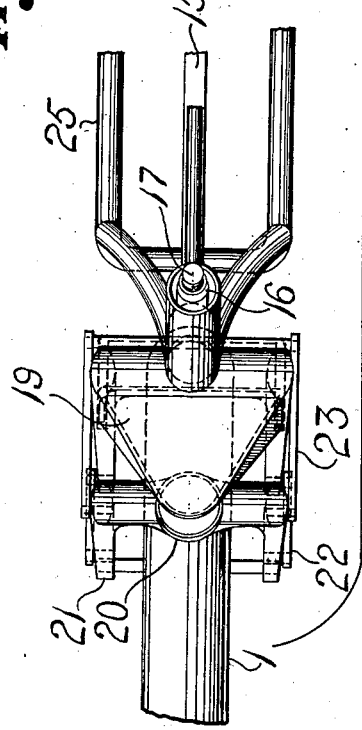
Fig. 7
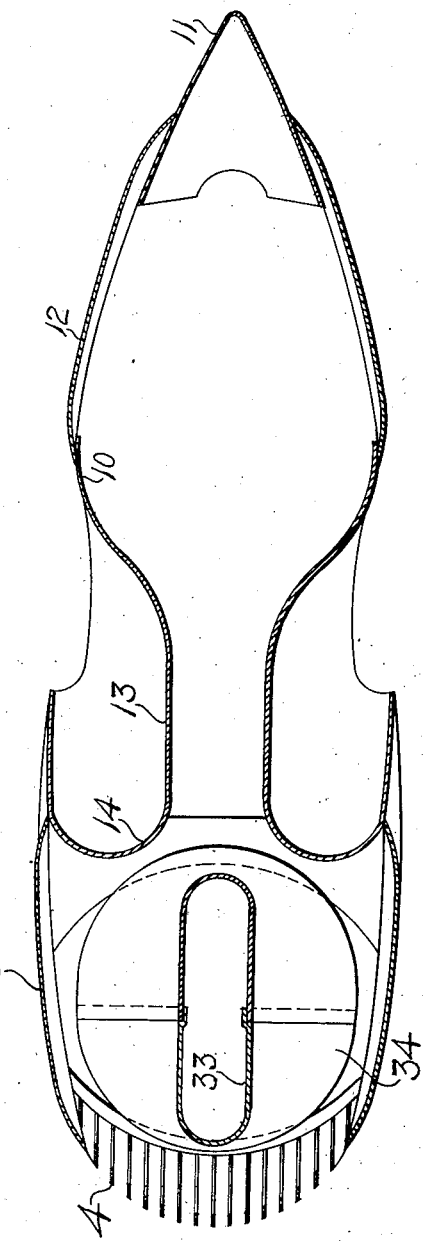
INVENTOR
Orley Ray Courtney
BY
Samuel H. Davis
ATTORNEY Patented Mar. 31, 1936

2,035,462

UNITED STATES PATENT OFFICE 2,035,462

STREAMLINE MOTORCYCLE BODY

Orley Ray Courtney, Lansing, Mich.

Application July 12, 1934, Serial No. 734,844

5 Claims. (Cl. 208—93)

This invention relates to streamline motorcycle bodies, having generally for its object to provide an air flow motorcycle that will give greater riding comfort; which will keep the motor cooler than usual in the present form of such machines in common use, and which is equipped with so-called "knee action" devices which give smoother riding quality to the vehicle. Snubbers are also introduced whereby the jolting and jars of ordinary street and road riding are noticeably reduced or mitigated. Other desirable objects of the construction and the operative result thereof will be readily discerned from the following description and from the accompanying drawings illustrating the formations, combinations and working relations of the mechanical parts associated.

Of the drawings:

Fig. 1 represents a front view showing the grille.

Fig. 2 is a side view of all parts assembled.

Fig. 3 is a top view.

Fig. 4 is a rear view.

Fig 5 is a side view of the motorcycle frame and the supporting wheels, without the external casing, showing the structure of the knee actions and position and arrangement of the snubbers.

Fig. 6 is a top view of the machine frame with the casing removed.

Fig. 7 is a horizontal section of the body casing on the broken line 7—7 of Fig. 2.

Throughout the drawings and description the same number is used to refer to the same part.

Considering the drawings, the front wheel 1 and the rear wheel 2 carry an external body or casing the front portion of which has the outwardly extending sides 3, a grille 4 of any chosen configuration, and an upwardly continuously rounded top or dome 5. A windshield 6 with forwardly inclined and rounding surface is connected with the top 5 and rises somewhat higher than the top, and above the handle bar 7 of the machine. To the rear of the windshield and handle bar is the seat 8 carried by the casing, and this saddle or seat is usually made with a relatively high back in order to afford greater comfort to the operator. The motor 9 occupies a lower position in the casing as best shown in Fig. 2. From the seat the casing extends in a continuously rounded tapering construction to a closed rear end 11. It is not intended to limit this invention to the respective heights, widths or curving surfaces illustrated as those dimensions may obviously be varied by different designers. The rear portion usually extends outwardly somewhat at the sides 12 as represented in Fig. 4.

Considering Fig. 7, it will be noted that the casing has a relatively narrow waist 13 constructed with the leg guards 14 for the protection of the legs of the driver in cooler weather. At the bottoms of the curving channels termed leg guards for the purposes of this explanation, the casing is provided with or formed into mud guards or running boards to keep all splashing from the front wheel from striking the clothes of the driver. In Fig. 3 it will be noted that the narrow or waist portion 13 of the casing or body rests upon the lower side members of the frame 15, and the casing may be secured thereon if so desired. The front forks and front wheel are constructed so they may rotate in the external casing. The body or casing is supported by the frame of the vehicle and not by any moving parts.

In Figs. 5 and 6 the machine frame, marked as a whole 15, has the steering column sleeve 16, the column 17 and the front wheel fork 18. By means of a suitable bracket 19 engaging the top of a coil spring 20 the front wheel fork or steering fork 18 is resiliently connected with the auxiliary front wheel fork 21. The lower part of fork 18 is pivotally connected with the fork 21 by the link 22, and a second link 23 pivotally connects the upper part of the fork 21 with a snubber 24. As the snubber is attached to the fork 18 the two forks are thus connected by the upper link 23. At the rear, the upper bars or tubes 25 of the machine frame carry the rearwardly projecting overhang 26 which engages the coil spring 27. The lower end of spring 27 engages a bracket carried by the rear wheel fork 28, and the frame members 25 are pivotally connected by means of the inclined piece 29 and the link 30 with the lower part of the rear wheel fork 28. At the top the overhang 26 carries at its junction with the frame members 25 a snubber 32 which is pivotally connected by the link bar 31 with the rear wheel fork 28. The specific individual mechanism of the snubbers forms no part of this invention, as they may comprise suitable resilient devices of which there are many applicable kinds now purchasable in the open market.

Referring again to Fig. 7, there will be noted the front wheel mud guard 33 carrying the splash plate 34 or the like to prevent the entrance of mud and water thrown up by the progress of the front of the machine.

In operation, the air coming in through the grille passes around the front wheel mud guard and over the splash plate, thence around the leg guards and through the waist over the motor which is thereby effectively cooled and overheating avoided. The rear of the casing is open at the bottom as shown, and the air passes out below as will be readily understood.

Having now described this invention, its structure and use, I claim:—

1. In a motorcycle body, a unitary external casing for the frame and motor having a continuously rounded upwardly and outwardly extending front portion, a waist portion of narrow construction less in width than the front and rear portions, and a continuously rounded upwardly and outwardly extending rear portion of tapering construction and rearwardly closed.

2. In a motorcycle body, a unitary external casing for the frame and motor having a continuously rounded upwardly and outwardly extending front portion, a waist portion of narrow construction less in width than the front and rear portions formed to constitute leg guards, and a continuously rounded upwardly and rearwardly extending rear portion of rearwardly tapering construction and closed at the rear end.

3. In a motorcycle body, in combination with front and rear wheels, front and rear wheel forks, a frame, and an external casing for the frame and motor resiliently supported by the said frame, the said casing having a continuously rounded upwardly and outwardly extending front portion, a waist portion of narrow construction less in width than the front and rear portions, and a continuously rounded upwardly and rearwardly extending rear portion of rearwardly tapering construction and closed at the rear end.

4. In a motorcycle body, in combination with front and rear wheels, front and rear wheel forks, front and rear wheel knee action devices as described comprising resiliently connected forks and levers, a frame, and an external casing for the frame and motor having a continuously rounded upwardly and outwardly extending front portion resiliently supported by said frame, a waist portion of narrow construction less in width than the front and rear portions, and a continuously rounded rear portion resiliently supported by said frame and of rearwardly tapering construction rearwardly closed.

5. In a motorcycle body, in combination with front and rear wheels, front and rear wheel forks, a frame, front and rear wheel knee action devices as described comprising resiliently connected forks and links, snubbers connected with the said front and rear wheel forks and with said front and rear wheel knee action devices, an external casing for the frame and motor having a grille and a continuously rounded upwardly and outwardly extending front portion resiliently supported by said frame, a waist portion of relatively narrow construction, and a continuously rounded rear portion resiliently supported by said frame and of rearwardly tapering construction rearwardly closed.

ORLEY RAY COURTNEY.